United States Patent

[11] 3,536,134

[72] Inventors Fred W. Staub;
 Paul H. Kydd, Scotia, New York
[21] Appl. No. 829,577
[22] Filed June 2, 1969
[45] Patented Oct. 27, 1970
[73] Assignee General Electric company
 a corporation of New York

[54] CONDENSER
 9 Claims, 8 Drawing Figs.
[52] U.S. Cl. .................................................. 165/110,
 138/32, 165/134, 165/174, 165/180
[51] Int. Cl. ...................................................... F28b 1/06,
 F28f 13/00
[50] Field of Search ............................................. 138/32;
 165/110, 111, 134, 174, 177, 180

[56] References Cited
 UNITED STATES PATENTS
 2,238,952 4/1941 Stacey .......................... 165/134
 2,332,336 10/1943 Norris .......................... 165/110X
 2,519,844 8/1950 Mojonnier ..................... 165/134X
 3,067,818 12/1962 Ware et al. .................... 165/174

Primary Examiner—Albert W. Davis, Jr.
Attorneys—Paul A. Frank, Richard R. Brainard, John F. Ahern, Julius J. Zaskalicky, Joseph B. Forman, Frank L. Neuhauser and Oscar B. Waddell ABSTRACT: Freezeup of the tubes of a surface condenser is inhibited by the provision of a plurality of spacers of low conductivity material, each in contact with the walls of the tubes and extending generally transversely to the direction of vapor flow therealong and also extending a small distance along the direction of flow. A plurality of partitions are also provided, each located between a respective pair of spacers and spaced with respect to the walls of the tubes to form with the walls and the spacers a plurality of chambers therewith. Openings are provided at each end of each of the partitions adjacent the spacers thereof, whereby excessive cooling of the vaporous medium by a coolant causes the vaporous medium to condense and solidify in the openings and seal the chambers, thereby providing thermal barriers which reduce the rate of cooling in the main stream of the vaporous medium and the consequent freeze up thereof.

Patented Oct. 27, 1970

Inventors:
Fred W. Staub,
Paul H. Kydd,
by their Attorney.

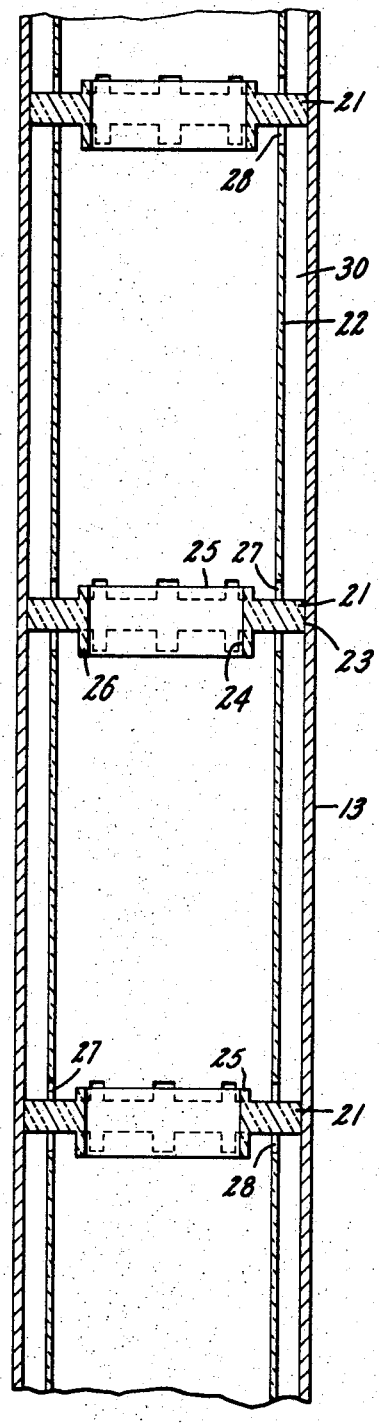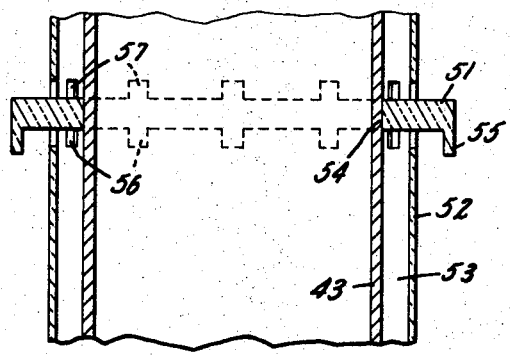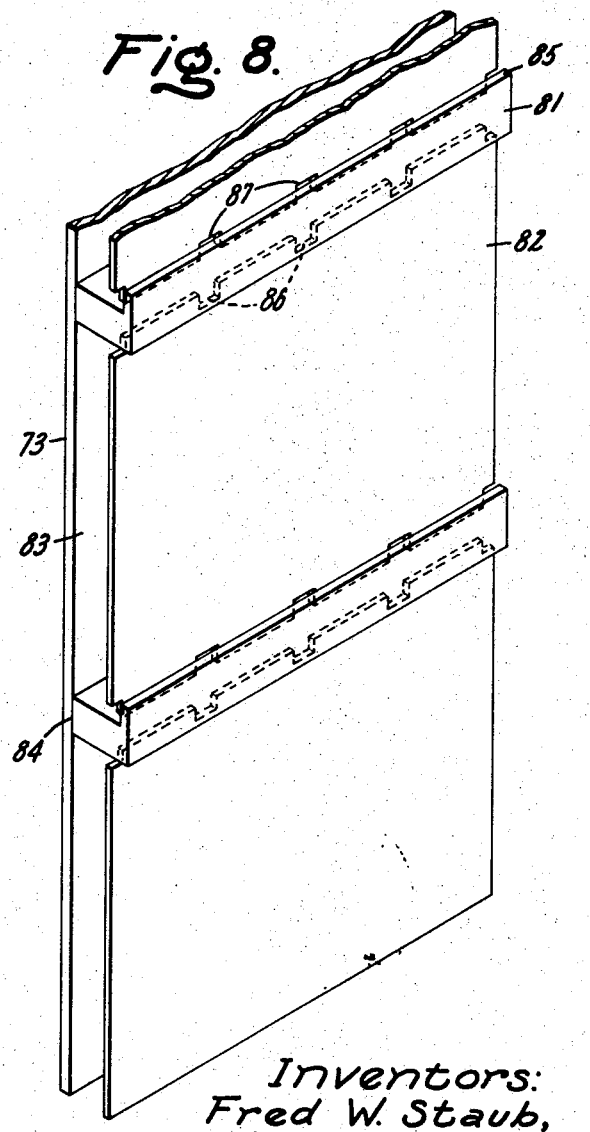

Patented Oct. 27, 1970

Inventors:
Fred W. Staub,
Paul H. Kydd,
by *Julius Pashkelecz*
Their Attorney.

CONDENSER

The present invention relates to condensers in general and, more particularly to a surface condenser for steam and similar vaporous media which is cooled by atmospheric air or other coolant whose temperature can be lower than the freezing temperature of the fluid being condensed.

When such a condenser is operated at coolant temperatures sufficiently below the freezing point of the condensate, the condensate freezes and at least partially blocks the vapor passages within the condenser. Under some circumstances such frozen condensate could completely block the passages particularly near the exit of the condenser where only a small supply of the vapor is available. Even if such blockage does not result in undesirably high input pressures in the condenser at less than full load conditions, any sudden increase in heat load supply to the condenser would cause a pressure rise in the condenser. Such rise in the condenser could result in uneconomic operation of the power plant with which the condenser is associated. Also, excessive frozen condensate formation could damage the condenser itself.

For air cooled steam condensers for small power plant operations, there are currently available freeze-up control systems, which divert or recirculate air flow by means of baffles or louvers which are manually or automatically controlled, or which vary the speed or pitch of a coolant circulation fan. Such active systems, however, are subject to unreliable operation in very cold weather.

Accordingly, an object of the present invention is to provide a passive, self-limiting means for controlling the freezing of condensate in a condenser.

Another object of the present invention is to provide a passive structure for limiting the freezing of the condenser passages of a surface condenser.

Another object of the present invention is to provide a simple, yet effective means to prevent and limit freeze-up of a surface condenser.

A further object of the present invention is to provide a passive freeze-up control structure for a surface condenser which is effective over a wide range of operating conditions.

In accordance with an illustrative embodiment of the present invention, there is provided a condenser to which is supplied a stream of coolant and also to which is provided a stream of vaporous medium which it is desired to condense. The condenser is provided with a plurality of tubes forming one channel and the spaces between the tubes forming another channel. The vaporous medium is applied to the tubes and the stream of coolant is passed in the channel formed between the tubes. A plurality of spacers of low conductivity material are provided within each of the tubes, each of the spacers being in contact with the inner surface of the wall of the tube and extend traversely to the direction of vapor flow therealong. A plurality of partitions are provided, each located between a respective pair of spacers and spaced with respect to the wall of the tube adjacent thereto to form a plurality of chambers. Openings are provided at each end of the partitions adjacent the adjacent spacers thereof whereby excessive cooling of the vaporous medium causes the openings to become sealed by solidification of the condensed vapor. Thus, the aforementioned chambers form thermal barriers which reduce the rate of cooling in the main stream of the vaporous medium and the consequent freeze-up thereof.

The novel features which are believed to be characteristic of the present invention are set forth in the appended claims. The invention itself, however, together with further objects and advantages thereof may best be understood by reference to the following description taken in connection with the accompanying drawings in which:

FIG. 3 is an enlarged vertical section of a portion of a tube of the condenser of FIGS. 1 and 2.

FIGS. 5 is an enlarged vertical section of a portion of one of the tubes of the assembly of FIG. 4.

FIG. 8 is a perspective view of a wall of the assembly of FIG. 6.

Figure 1:
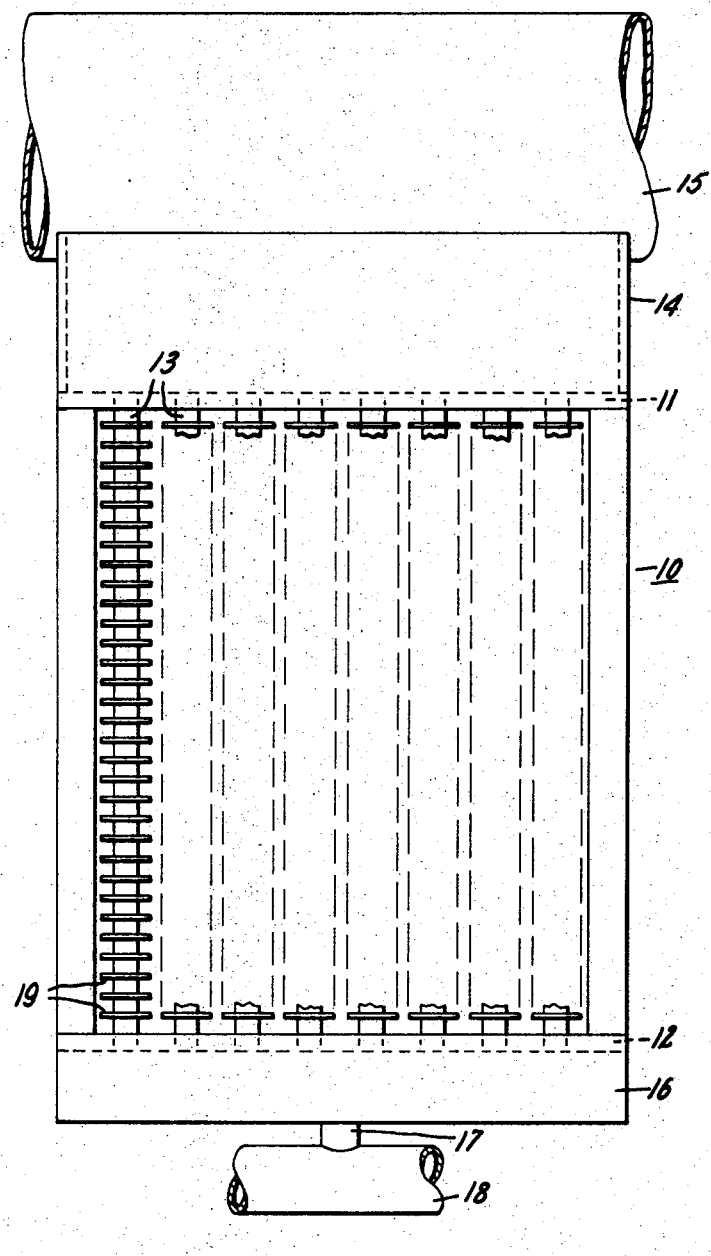
FIG. 1 is a front view of a condenser assembly which forms part of a condenser plant.
Figure 2:
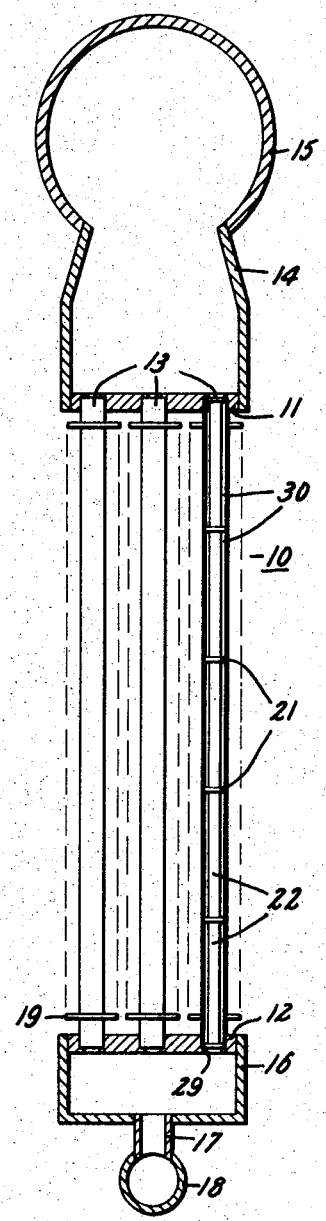
FIG. 2 is a side view of the condenser assembly of FIG. 1 with one of the tubes thereof in section.

Referring now to FIGS. 1 and 2 there is shown a condenser assembly 10 comprising an upper base plate 11 and a lower base plate 12 between which are mounted a plurality of condenser tubes 13. A supply header 14 is mounted to upper base plate 11 to provide vaporous medium, such as steam, to the upper openings of the tubes 13. The header 14 in turn is supplied by a distribution conduit 15. A receiving header 16 is mounted to the lower base plate 12 to collect condensate from the lower openings of the tubes 13. The collected condensate is passed through pipe 17 to a collecting conduit 18. Of course, each condenser assembly 10 may be equipped with an air evacuating device (not shown) to withdraw air which remains in the header 16 upon evacuation of the condensate into the collecting conduit 18. On each of the pipes is located a plurality of fins 19 to facilitate the cooling thereof. A plurality of condenser assemblies such as shown in FIGS. 1 and 2 may be mounted in banks to obtain the cooling capacity need. Also, each of the condenser assemblies may be inclined to the vertical and cooling air may be directed over the external surfaces of the tubes 13 by convection, or by forced cooling by fans (not shown).

In accordance with the present invention, located on the inside of each of the tubes are a plurality of cylindrical spacers 21 and a plurality of cylindrical partitions 22 as shown in the sectioned tube 13 of FIG. 2 to form a plurality of chambers 30. An enlarged cross-sectional view of a part of such tube is shown in FIG. 3 to which reference is now made. The spacers 21 are provided at equally spaced distances along the internal wall of the tube. The spacers 21 may be force fitted into the tube 13 or secured thereto by other suitable means. Each of the spacers 21 are annular in shape having an outside surface 23 contacting the inside surface of the wall of tube 13 and an inside surface 24 forming a central opening in the tube 13. The upper face of each spacer 21 is provided with an annular ring or retainer 25 adjacent the inside surface 24 and the lower face of each spacer is provided with another annular ring or retainer 26 adjacent the inside surface 24. The upper annular ring 25 provides a dam or retainer for condensate for reasons which will be explained below and the lower ring 26 provides a baffle to inhibit the drainage of liquid into the passageway between the spacer 23 and the partition 22 from above. Each of the partitions 22 have a slightly smaller diameter than the inside diameter of the tube 13 and each is spaced between a respective pair of spacers 21. Each of the partitions 22 is made of a low conductivity material and is spaced between the partitions so as to allow openings 28 between the upper end of the partitions 22 and adjacent spacer 21 and openings 27 between the lower end of the partitions and an adjacent spacer 21. The partitions 22 may be formed so as to rest on the spacer 21 below it and so as to abut the spacer above it. The diameter of the partition 22 is made slightly larger than the outside surface of the rings 25 and 26 so as to permit adequate clearance between the rings and the partition for ingress and egress of fluid to the chambers 30. Shoulders 29 may be provided in the holes of the lower base plate 12 of FIGS. 1 and 2 to support the spacers 21 or partitions 22 located at the bottom end of the tubes 13.

Under normal operating conditions, that is, above the freezing point of condensate formed on the inside of the tube 13, vapor entering from header 14 will enter the openings 28 of tube 13 between the spacer 21 and the partition 22 and pass to the lower openings 27. The vapor in passing from the openings 28 to the openings 27 of chambers 30 will be condensed by the cold surface of the tube 13 and form condensate which will collect on the upper face of spacer 21. All of the condensate will flow through the opening 27, over the lip 25 on spacer 21, and drain to the bottom of the tube 13. The lower lip 26 inhibits the flow of the condensate around into the inlet openings 28 and down an adjacent lower section of the tube 13. Such flow would impair the cooling efficiency of the tube 13. Thus, the arrangement provides complete removal of condensate formed above a spacer from the condenser surface existing below it with the result that improved condensing side heat transfer between the vaporous medium and the wall of the tube 13 is obtained.

To prevent freeze-up, the structure described in addition to removing condensate from the wall of tube 13, also creates a gas barrier of air and vapor in the chamber 30 having low heat transfer coefficient which inhibits cooling of the side of partition 22 facing the axis of the tube 13 and hence the blockage thereof by frozen condensate. The gas barrier is created in the manner to be presently described. When the condenser tube 13 reaches a temperature where freezing takes place, the first section to freeze is that having the lowest condensing side heat transfer coefficient. This would be the section where condensate has accumulated in the vicinity of the opening 27. The freezing of such condensate will block the opening 27. The stagnant gas between the partition 22 and the wall of tube 13 can now only be supplied with vapor by diffusion through the inlet port 28. Such process is extremely slow due to the length of the diffusion path from the source of vapor to the inside of the chambers 30. Such process also results in the blockage of the entrance port 28 as well due to the faster frost buildup thereat, especially in view of the fact that the heat transfer coefficient is higher adjacent the spacer than it is at points therebetween.

To promote freezing at the exit opening 27 prior to other locations, the spacer 21 can be made with appreciable height so that substantial cooling exists at the juncture of the spacer 21 and the wall where there is a stagnant layer of condensate. Such structure will also promote prompt freezing of the water vapor diffusing into the entrance port 28 after the exit port 27 has closed and the partial pressure of air in the gas barrier in chambers 30 has increased.

Another advantage of making the spacer area contacting the side walls sufficiently large is that any vapor or liquid flowing between the outside surface thereof and the wall in the process of flowing therebetween freezes and provides a good seal and inhibits the further flow of liquid from one chamber to the other.

By providing the desired number and length of the control sections or chambers in the condenser tubes, a range of condenser loading conditions can be accommodated to keep freezing down to the minimum and to permit maximum final condensate temperatures in the return line of the condenser.

Figure 4:
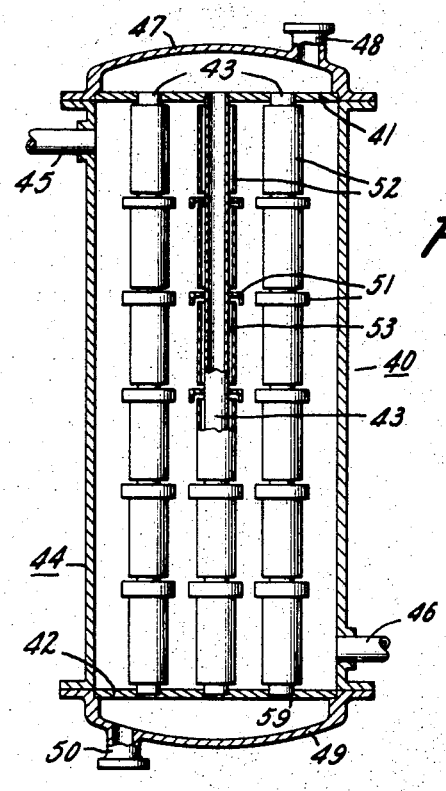
FIG. 4 is a front elevation view in section of a condenser assembly showing another embodiment of the present invention.

Referring now to FIG. 4, there is shown a condenser assembly 40 comprising an upper base plate 41 and a lower base plate 42 between which are mounted a plurality of condenser tubes 43. A cylindrical enclosure 44 is provided about the condenser tubes 13 to form with the outer surfaces of the tubes a channel for the passage of a vaporous medium to be cooled such as steam therethrough. For such purpose a supply conduit 45 is located near the upper base plate 41 and a collection conduit 46 is located near the lower base plate 42 in the enclosure 44. A supply header 47 for the purpose of supplying coolant to the interior of the tubes 43 is mounted to the upper base plate 41. The header in turn is supplied by a conduit 48 to which the low temperature coolant is supplied. A receiving header 49 is mounted to the lower base plate 42 to collect condensate from the lower openings of the tubes 43. The collected coolant is passed through the exhaust port 50 to be recirculated or discharged.

In accordance with the present invention, located on the outside of each of the tubes are a plurality of cylindrical spacers 51 and a plurality of cylindrical partitions 52 as shown in section tube of FIG. 5 to form a plurality of chambers. An enlarged cross-sectional view of a part of such tube is shown in FIG. 5 to which reference is now made. The spacers 51 are provided at equally spaced distances along the external wall of the tube. The spacers may be force fitted onto the tube or secured thereto by other means. Each of the spacers are annular in shape having an inside surface 54 contacting the outside surface of the wall of the tube 43. The lower face of each spacer is provided with an annular ring or retainer 55 adjacent the outside surface which provides a baffle to inhibit entry of liquid into the passageway or chamber 53 between the spacer and the partition. Each of the partitions 52 have a slightly greater diameter than the outside diameter of the tube and each is spaced between a respective pair of spacers 51. Each of the partitions 52 is made of low conductivity material and is spaced between the partitions so as to allow openings 56 between the upper portion of partitions 52 and an adjacent spacer and openings 57 between the lower end of the partitions 52 and an adjacent spacer. The partitions 52 may be formed so as to rest on the spacer below it and so as to abut an upper spacer. The diameter of the partition 52 is made slightly larger than the inside surface of the spacer surface to permit openings between the rings 55 and the partition 52. Shoulders 59 may be provided in the holes of the lower base plate of FIG. 4 to support the spacers or partitions located at the bottom end of the tubes 43. The operation of the condenser of FIGS. 4 and 5 in particular with regard to the passive freeze-up control structure described is similar to that described for the passive control device of FIGS. 1, 2, and 3.

Figure 6:
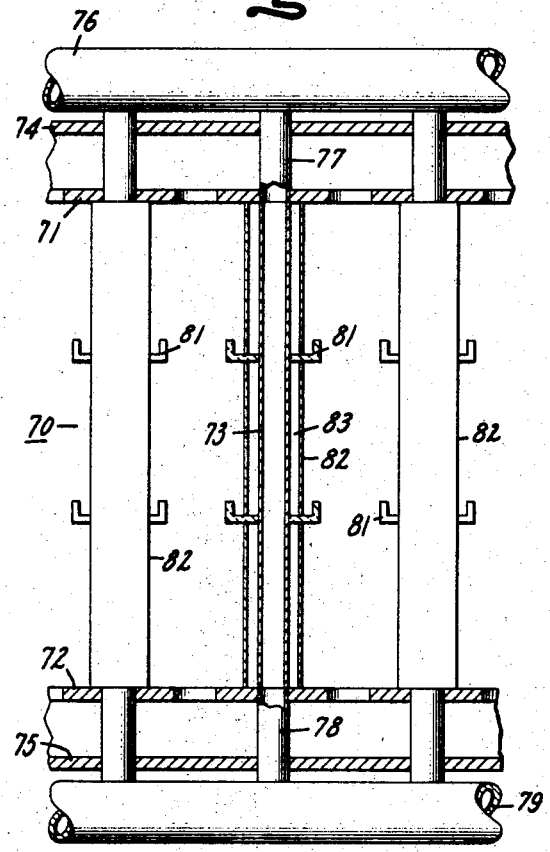
FIG. 6 is a front view of a part of a condenser assembly showing still another embodiment of the present invention utilizing planar elements.
Figure 7:
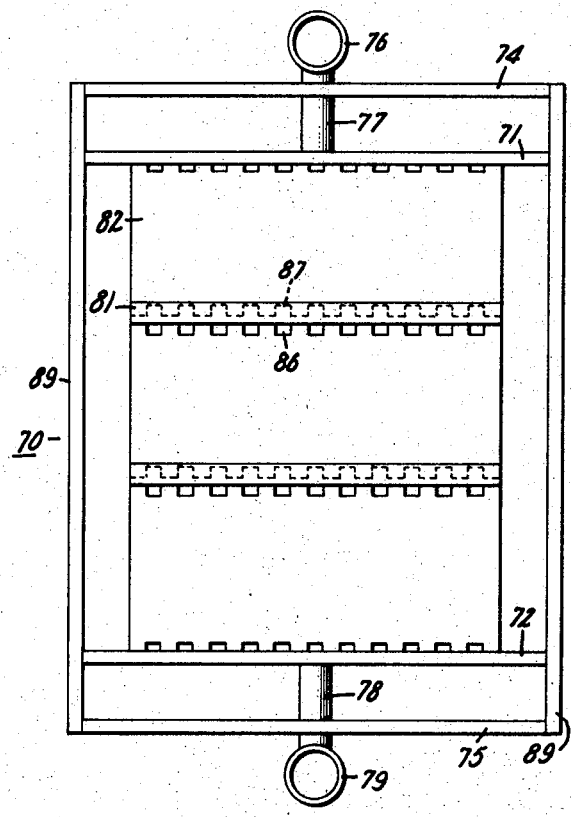
FIG. 7 is a side view of FIG. 6.

Referring now to FIGS. 6 and 7, there is shown a part of a condenser assembly 70 comprising an upper base plate 71 and a lower base plate 72 between which are mounted a plurality of condenser conduits 73 rectangular in cross section. An enclosure 89, only part of which is shown in FIG. 7, is provided between the base plates 71 and 72 and around the conduits 73. A header 74 is mounted to the upper base plate to provide vaporous medium such as steam to the upper openings in the base plate for condensation by the condenser tubes 73. The header 74 in turn is supplied by a distribution conduit (not shown). A receiving header 75 is mounted to the lower base plate 72 to collect condensate from the lower openings located therein between the condenser conduits 73. The collected condensate is passed through a collection conduit (not shown) connected to the header 75. A supply manifold 76 is provided for supplying low temperature coolant to the condenser conduits 73. To the manifold are connected a plurality of pipes 77 each of the which is connected to a respective condenser cooling conduit to supply coolant to the internal portions of the condenser conduit 73. The coolant is collected by collection pipes 78 which in turn are connected to a collection manifold 79 for recirculation or discharge of the coolant.

In accordance with the present invention located on the outside of each of the wide faces of the conduits or tubes 73 are a plurality of linear spacers 81 and a plurality of planar partitions 82 as shown in the section tube of FIG. 6 to form a plurality of chambers 83. An enlarged perspective view of part of a planar section of the conduit 73 is shown in FIG. 8 which reference is now made. The spacers 81 are provided at equally spaced distances along the external wall of the conduit 73. The spacers may be sealed thereto by means of adhesive or physically attached by means of screws. In place of adhesives or screws, supporting grid structures may be provided in the vapor spaces between conduits 73 to support the spacers 81 and partitions 82 against the heat transfer surfaces of conduits 73. Each of the spacers have a surface 84 contacting the outside surface of the wall of the conduit 73. The upper face of each spacer 81 is provided with a retainer 85 adjacent the outside surface thereof. The retainer provides a dam for condensate for reasons explained above in connection with FIG. 3. Each of the partitions 82 is made of a low conductivity material and spaced between partitions so as to allow openings 86 between the upper end of the partition and the adjacent spacer and openings 87 between the lower end of the partition and an adjacent spacer. The partitions 82 may be formed so as to bear on the spacer 81 below it and so as to abut an upper spacer. The operation of the assembly of FIGS. 6, 7 and 8 similar to the operation explained in connection with FIGS. 1, 2 and 3.

We claim:

1. In combination in a condenser:

means for providing a stream of coolant;

means for providing a stream of vaporous medium the temperature of which it is desired to lower, a wall of high conductivity material separating said streams, one side of said wall in contact with said stream of coolant and the other side thereof in contact with said vaporous medium to be cooled;

a plurality of spacers of low conductivity material, each in contact with said other side of said wall and extending generally transversely to the direction of vapor flow therealong and also extending a small distance along the direction of flow, a plurality of partitions each located between a respective pair of spacers and spaced with respect to said wall to form with said wall and said spacers a plurality of chambers therewith; and means for providing openings at each end of each of said partitions adjacent spacers thereof, whereby excessive cooling of said vaporous medium by said coolant causes said vaporous medium to condense and solidify in said openings and seal said chambers thereby providing thermal barriers which reduce the rate of cooling in the main stream of said stream of vaporous medium and the consequent freeze-up thereof.

2. The combination of claim 1 in which each of said spacers extend beyond the end of said partitions and a lip is provided on each of said spacers extending a short distance along the direction of flow of vaporous medium therein.

3. The combination of claim 2 in which said lip extends in the direction of flow of vaporous medium therein.

4. The combination of claim 2 in which said lip extends in a direction opposite to the direction of flow of vaporous medium therein.

5. A condenser comprising:

a plurality of tubular conductive members, the internal surface of the walls of each of said tubular members defining one channel and the external surfaces of the walls of said tubular members defining another channel;

means for coupling one of said streams to said one of said channels and the other of said streams to the other of said channels;

a plurality of spacers of low conductivity material, each in contact with one side of the walls of said tubular member and extending generally transversely to the direction of vapor flow therealong and also extending a small distance in the direction of vapor flow therealong, a plurality of partition members, each located between a respective pair of spacers and spaced with respect to a respective wall of said tubular members; and means for providing openings at each end of each of said partitions adjacent the adjacent spacers thereof.

6. The combination of claim 5 in which said spacers are located on the internal surfaces of the walls of said tubular members.

7. The combination of claim 5 in which said spacers are located on the external surfaces of the walls of said tubular members.

8. The combination of claim 5 in which said tubular members are circular in outline and said spacers are annular.

9. The combination of claim 5 in which said tubular members have planar walls.